(12) United States Patent
Neault et al.

(10) Patent No.: US 6,901,694 B1
(45) Date of Patent: Jun. 7, 2005

(54) METHOD OF DISPENSING VERMIN AND INSECT POISON

(76) Inventors: Robert V. Neault, W4774 Palmer Rd., Lake Geneva, WI (US) 53147; Claude J. Neault, 3563 Park Dr., Lake Geneva, WI (US) 53147

( * ) Notice: Subject to any disclaimer, the term of this patent is extended or adjusted under 35 U.S.C. 154(b) by 0 days.

(21) Appl. No.: 10/808,770

(22) Filed: Mar. 25, 2004

(51) Int. Cl.[7] ............................................. A01M 25/00
(52) U.S. Cl. ....................................................... 43/131
(58) Field of Search .......................................... 43/131

(56) References Cited

U.S. PATENT DOCUMENTS

| | | | | | |
|---|---|---|---|---|---|
| 1,113,842 | A | * | 10/1914 | Sill | 43/131 |
| 1,302,160 | A | * | 4/1919 | Hedrich | 43/131 |
| 1,443,287 | A | * | 1/1923 | Snyder et al. | 43/131 |
| 1,471,954 | A | * | 10/1923 | Greenway | 43/131 |
| 1,579,512 | A | * | 4/1926 | Bushong | 43/131 |
| 2,480,724 | A | * | 8/1949 | Feussner | 43/131 |
| 2,725,666 | A | * | 12/1955 | Mullen | 43/131 |
| 2,860,445 | A | * | 11/1958 | Yates | 43/131 |
| 2,944,364 | A | * | 7/1960 | Kelly | 43/131 |
| 3,122,857 | A | | 3/1964 | Yates | |
| 3,303,600 | A | * | 2/1967 | Freeman | 43/131 |
| 4,208,829 | A | * | 6/1980 | Manning | 43/131 |
| 4,349,982 | A | * | 9/1982 | Sherman | 43/131 |
| 4,364,194 | A | * | 12/1982 | Clark, Sr. | 43/131 |
| 4,375,732 | A | * | 3/1983 | Waast | 43/131 |
| 4,400,904 | A | * | 8/1983 | Baker | 43/131 |
| 4,453,337 | A | * | 6/1984 | Williams | 43/131 |
| 4,462,182 | A | * | 7/1984 | French | 43/131 |
| 4,541,198 | A | * | 9/1985 | Sherman | 43/131 |
| 4,570,377 | A | * | 2/1986 | Primavera | 43/131 |
| 4,611,426 | A | * | 9/1986 | Willis | 43/131 |
| 4,619,071 | A | * | 10/1986 | Willis | 43/131 |
| 4,630,392 | A | * | 12/1986 | Ferraro | 43/131 |
| 4,637,162 | A | * | 1/1987 | Sherman | 43/131 |
| 4,648,201 | A | * | 3/1987 | Sherman | 43/131 |
| 4,658,536 | A | * | 4/1987 | Baker | 43/131 |
| 4,660,320 | A | * | 4/1987 | Baker et al. | 43/131 |
| 4,662,104 | A | * | 5/1987 | Mather et al. | 43/131 |
| 4,730,412 | A | * | 3/1988 | Sherman | 43/131 |
| 4,746,033 | A | * | 5/1988 | Morellini | 43/131 |
| 4,753,032 | A | * | 6/1988 | Sherman | 43/131 |

(Continued)

FOREIGN PATENT DOCUMENTS

AU 95-33181 A1 * 4/1996

(Continued)

Primary Examiner—Darren W. Ark
(74) Attorney, Agent, or Firm—Donald J. Ersler

(57) ABSTRACT

A method of dispensing vermin and insect poison includes a quantity of poison, a poison dispenser and at least one retention device. The poison dispenser preferably includes a poison retention area and at least one tubular passage leading to the poison retention area. The cross section of the at least one tubular passage is large enough to only allow a particular size of vermin to enter and not a larger creature. The poison retention area is preferably covered with a fill cap. At least one scent opening may be formed adjacent the poison retention area to allow a special scent to be placed adjacent the poison. The at least one retention device would be inserted into or around the poison dispenser and to a surface, such as the ground or an object adjacent the poison dispenser. The at least one retention device would prevent the poison dispenser from being moved.

10 Claims, 6 Drawing Sheets

U.S. PATENT DOCUMENTS

| | | | | |
|---|---|---|---|---|
| 4,802,303 | A | * | 2/1989 | Floyd III .................... 43/131 |
| 4,825,581 | A | * | 5/1989 | Dailey ........................ 43/131 |
| 4,831,775 | A | * | 5/1989 | Sherman .................... 43/131 |
| 4,835,902 | A | * | 6/1989 | Sherman .................... 43/131 |
| 5,027,548 | A | * | 7/1991 | Anderson ................... 43/131 |
| 5,136,803 | A | * | 8/1992 | Sykes et al. ................. 43/131 |
| 5,272,832 | A | * | 12/1993 | Marshall et al. ............. 43/131 |
| 5,749,168 | A | * | 5/1998 | Chrysanthis ................ 43/131 |
| 5,870,853 | A | * | 2/1999 | Williams .................... 43/131 |
| 5,921,018 | A | * | 7/1999 | Hirose et al. ................ 43/131 |
| 5,987,811 | A | * | 11/1999 | Wiesener et al. ............ 43/131 |
| 6,145,242 | A | * | 11/2000 | Simpson .................... 43/131 |
| 6,374,536 | B1 | * | 4/2002 | Washburn ................... 43/131 |
| 2003/0089025 | A1 | * | 5/2003 | Maffo et al. ................. 43/131 |

FOREIGN PATENT DOCUMENTS

| | | | |
|---|---|---|---|
| DE | 3905489 A1 | * | 8/1990 |
| DE | 3921865 A1 | * | 1/1991 |
| DE | 3921867 A1 | * | 1/1991 |
| DE | 4134678 A1 | * | 10/1992 |
| DE | 4431694 A1 | * | 3/1996 |
| DE | 19613008 A1 | * | 11/1996 |
| DE | 3627995 A1 | * | 3/1998 |
| DE | 10208138 A1 | * | 9/2003 |
| FR | 2232991 A1 | * | 2/1975 |
| FR | 2750573 A1 | * | 1/1998 |
| GB | 2096446 A1 | * | 10/1982 |
| GB | 2249249 A1 | * | 5/1992 |
| WO | WO-82/03968 A1 | * | 11/1982 |

* cited by examiner

METHOD OF DISPENSING VERMIN AND INSECT POISON

BACKGROUND OF THE INVENTION

1. Field of the Invention

The present invention relates generally to vermin and insect poison and more specifically to a method of dispensing vermin and insect poison that only allows the targeted vermin or insect to be poisoned.

2. Discussion of the Prior Art

There appears to be no effective dispenser of poison for killing vermin, such as mice or killing insects, such as ants; or any other unwanted pests. The poison frequently comes in the form of pellets. Unfortunately, pellets in a container or left out in the open may be consumed by animals other than the targeted vermin or insect. Further, the pellets will melt, when exposed to moisture or rain.

Accordingly, there is a clearly felt need in the art for a method of dispensing vermin and insect poison that only allows the targeted size of vermin or insect to be poisoned.

SUMMARY OF THE INVENTION

The present invention provides a method of dispensing vermin and insect poison. The method of dispensing vermin and insect poison includes a quantity of poison, a poison dispenser and at least one retention device. The poison dispenser includes a poison retention area and at least one tubular passage leading to the poison retention area. The cross section of the at least one tubular passage is large enough to only allow a particular size of the vermin to enter and not a larger creature. The poison retention area is preferably covered with a fill cap. At least one scent opening may be formed above the at least one tubular passage to allow a special scent to be placed adjacent the at least one scent opening. The special scent would attract vermin or insects from a further distance than the poison. The at least one retention device would be inserted into or around the poison dispenser and into the ground under the poison dispenser. The retention device may be attached to or around the poison dispenser and to an object, such as a tree. The at least one retention device would prevent the poison dispenser from being pried off the ground or away from an object.

Accordingly, it is an object of the present invention to provide a method of dispensing vermin and insect poison that only allows the targeted size of vermin or insect to be poisoned.

These and additional objects, advantages, features and benefits of the present invention will become apparent from the following specification.

DETAILED DESCRIPTION OF THE PREFERRED EMBODIMENTS

The method of dispensing vermin and insect poison includes a quantity of poison, a poison dispenser and at least one retention device. The poison dispenser preferably includes a poison retention area and at least one tubular passage leading to the poison retention area. The cross section of the at least one tubular passage is fabricated in different sizes for different creatures. The cross section of the tubular passage could be large enough to only allow vermin, such as mice to enter, but not allow larger animals, such as squirrels to enter. The cross section of the tubular passage could be large enough to not allow mice, but allow ants to enter.

Figure 1:
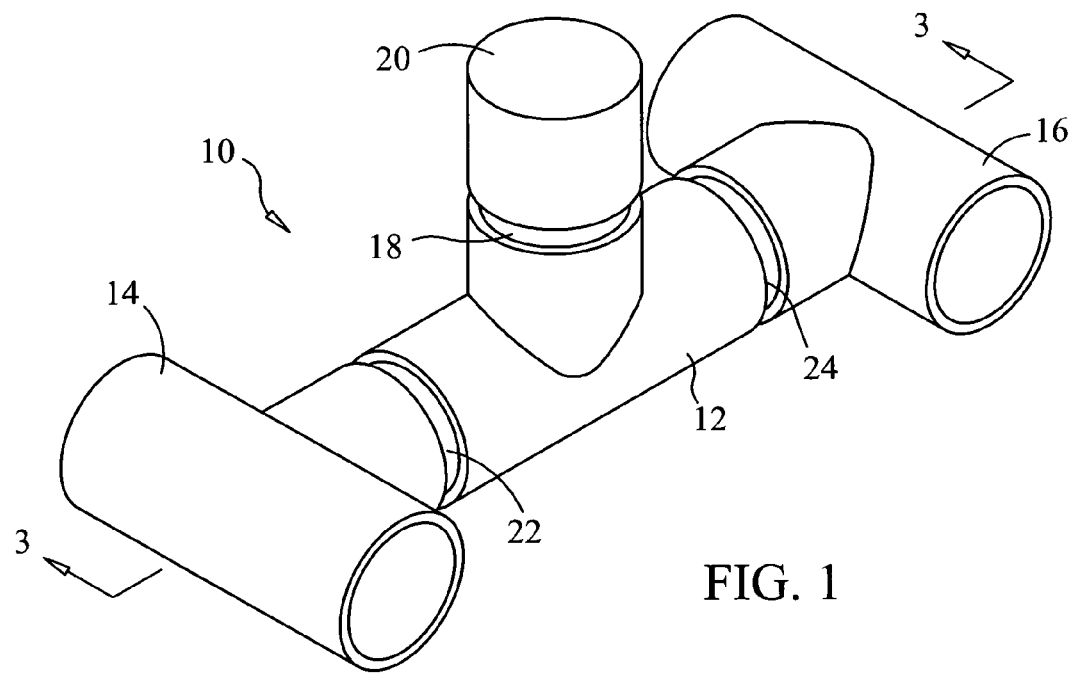
FIG. 1 is a perspective view of a poison dispenser in accordance with the present invention.
Figure 2:
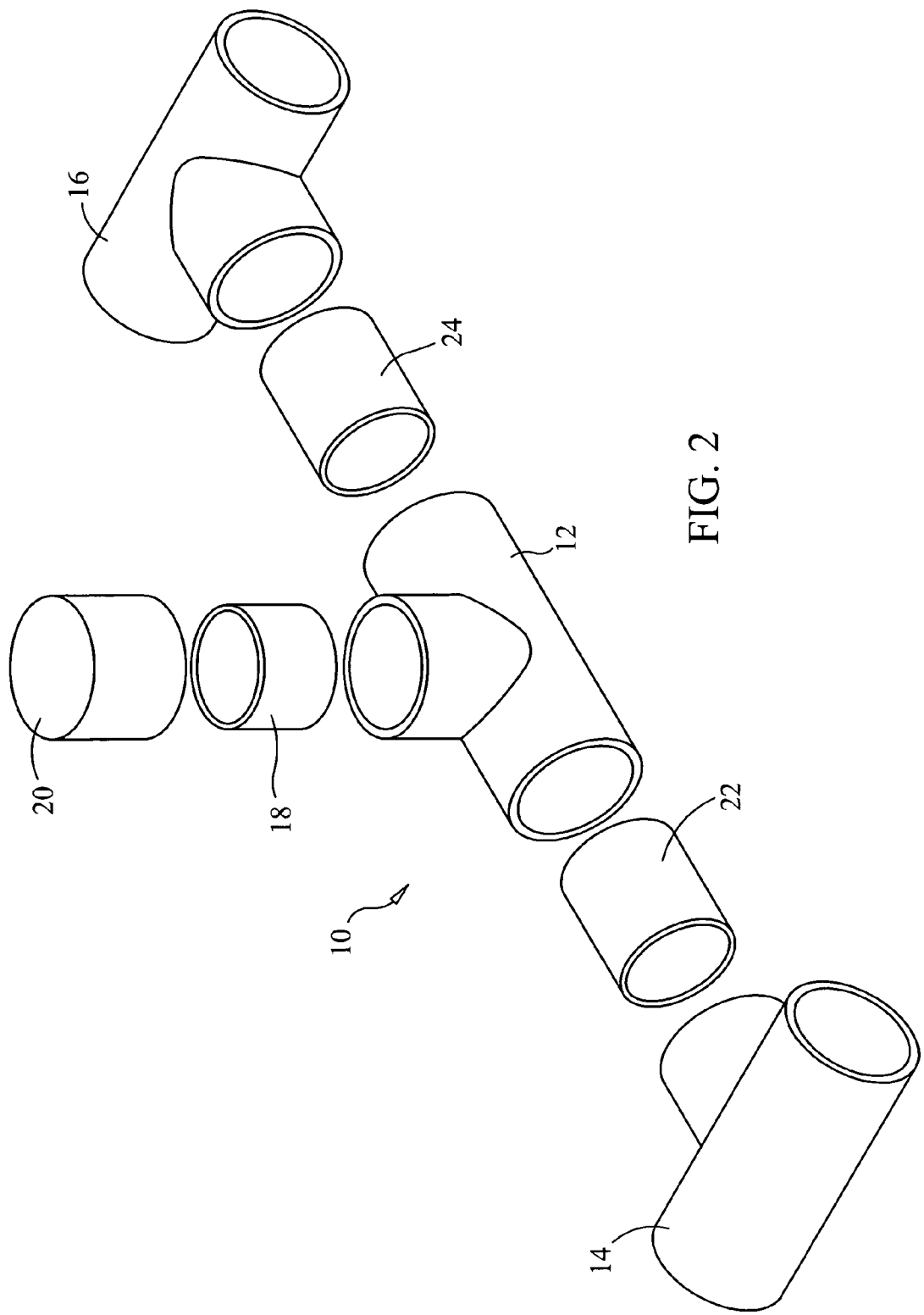
FIG. 2 is an exploded perspective view of a poison dispenser in accordance with the present invention.

With reference now to the drawings, and particularly to FIG. 1, there is shown a perspective view of a poison dispenser 10. The poison dispenser 10 is a preferred embodiment, but other designs of poison dispensers may also be used. With reference to FIG. 2, a preferred embodiment of the poison dispenser preferably includes a poison T-joint 12, a first entrance T-joint 14, a second entrance T-joint 16, a cap tube 18 and a fill cap 20. The poison T-joint 12 is terminated on two opposing ends with the first and second entrance T-joints.

The first entrance T-joint 14 may attached to one end of the poison T-joint 12 with any suitable method, such as press fitting a first tube 22 into the first entrance T-joint 14 and the poison T-joint 12. The second entrance T-joint 16 may attached to one end of the poison T-joint 12 with any suitable method, such as press fitting a second tube 24 into the second entrance T-joint 16 and the poison T-joint 12. The first and second entrance T-joints may also be attached to the poison T-joint 12 with adhesive or the like without the first and second tubes. One end of the cap tube 18 is press fit into the poison T-joint 12. The fill cap 20 is removably engaged with the other end of the cap tube 18.

Figure 3:
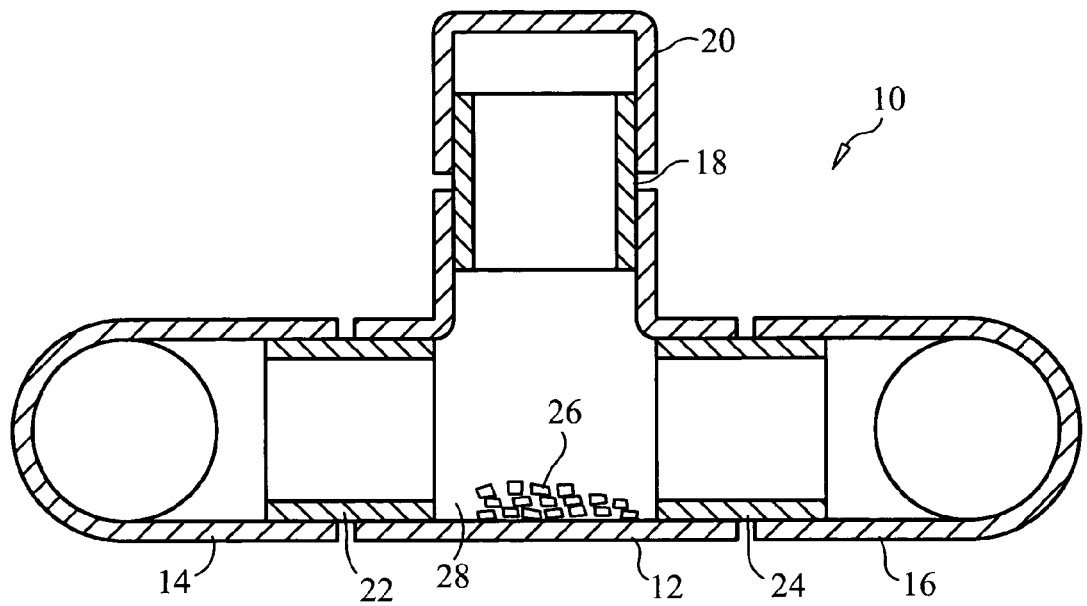
FIG. 3 is a side cross-sectional view of a poison dispenser for retaining poison in accordance with the present invention.
Figure 4:
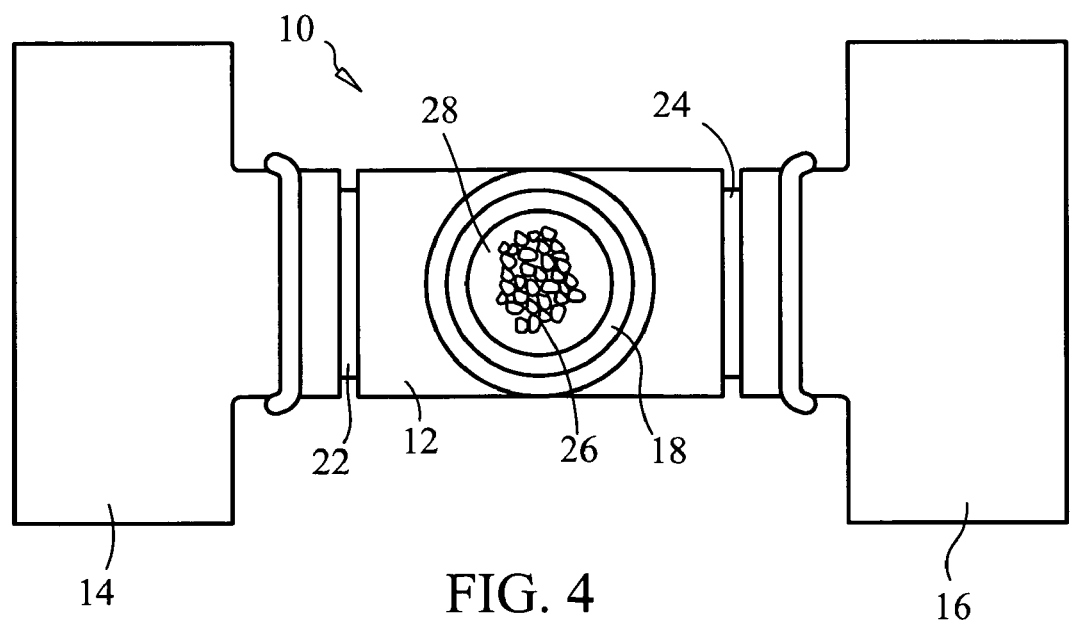
FIG. 4 is a top view of a poison dispenser with a fill cap removed in accordance with the present invention.

With reference to FIGS. 3–4, a quantity of poison 26 is placed in the poison T-joint 12 by removing the fill cap 20 and dropping the quantity of poison into a poison retention area 28 in the poison T-joint 12. The at least one tubular passage leading to the poison retention area 28 is created by inside perimeters of the first and second entrance T-joints. The quantity of poison 26 could be a pellet, a powder or have any other suitable form.

Figure 1A:
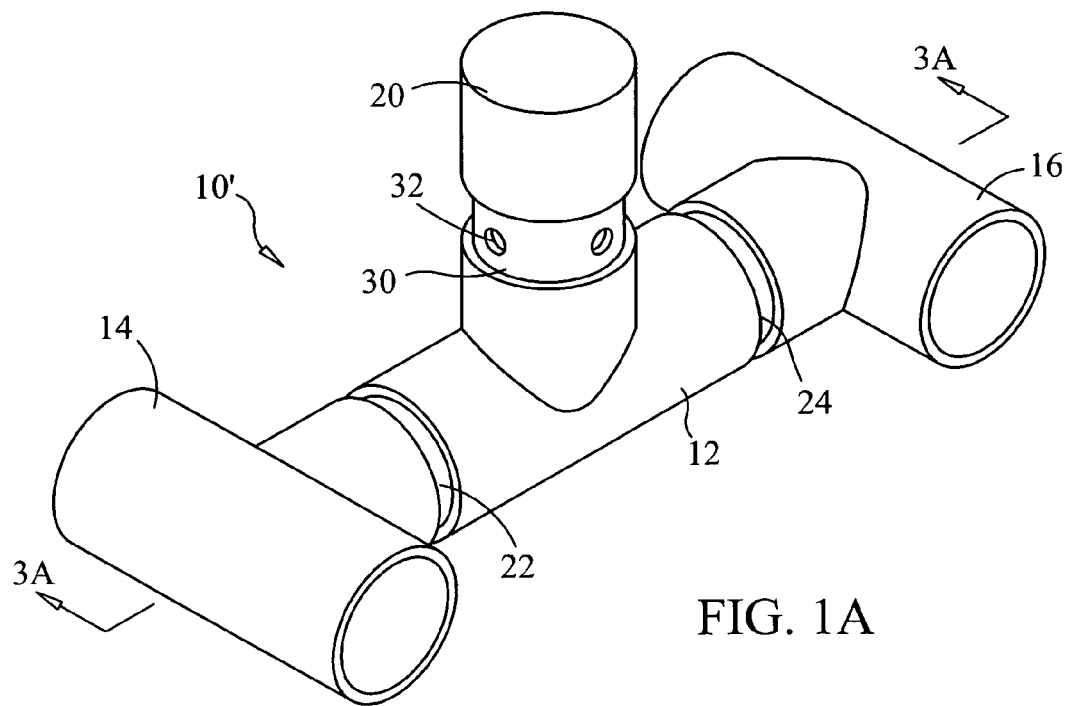
FIG. 1a is a perspective view of a poison dispenser with at least one scent opening in accordance with the present invention.
Figure 3A:
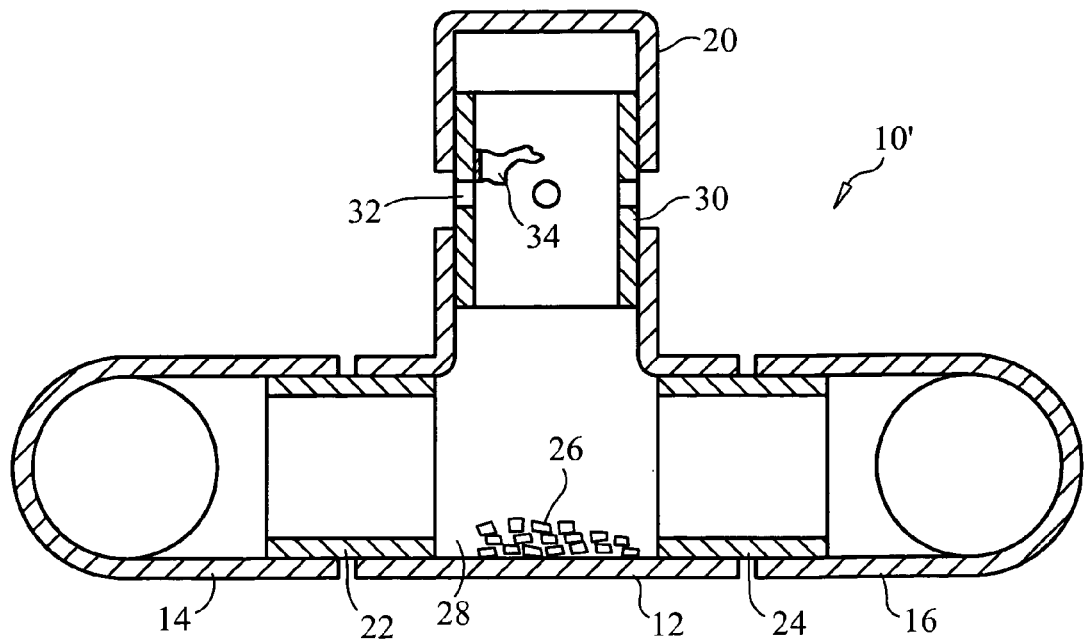
FIG. 3a is a side cross-sectional view of a poison dispenser for retaining poison with at least one scent opening in accordance with the present invention.

With reference to FIGS. 1a and 3a, a poison dispenser 10' includes the replacement of the cap tube 18 with a scented cap tube 30. One end of the scented cap tube 30 is pressed fitted into the poison T-joint 12 and the fill cap 20 is removably engaged with the other end of the scented cap tube 30. At least one scent opening 32 is formed through the scented cap tube 30. A quantity of a scent 34, such as peanut butter is applied to an inside of the scented cap tube 30, adjacent the at least one scent opening 32. Peanut butter is effective in attracting vermin, such as mice.

Figure 5:
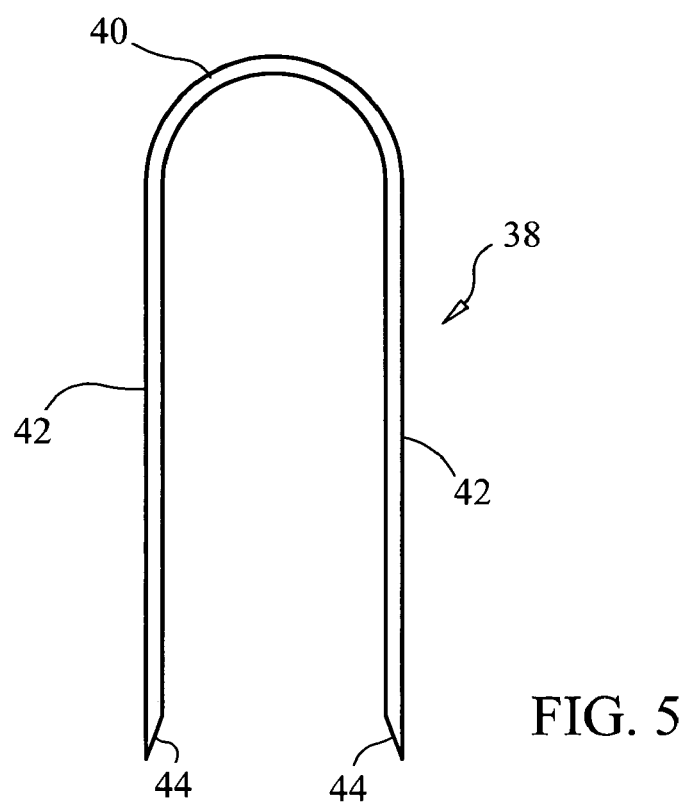
FIG. 5 is a side view of a loop retainer that is used to retain a poison dispenser in accordance with the present invention.
Figure 6:
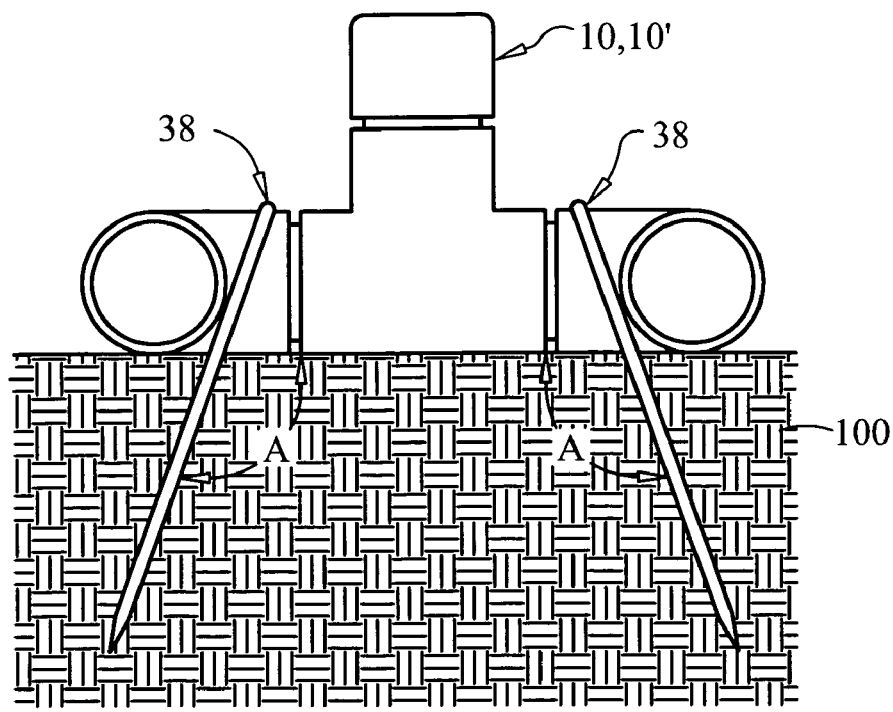
FIG. 6 is a side view of a poison dispenser retained relative to the ground with a pair loop retainers in accordance with the present invention.

With reference to FIGS. 5–6, at least one retention device 38 is preferably placed over the poison dispenser 10, 10' and inserted into an area of ground 100 under the poison dispenser 10, 10'. Each retention device 38 preferably includes a base loop 40 and two extended legs 42. A single extended leg 42 extends from each end of the base loop 40. A sharpened point 44 is formed on an end of each extended leg 42. An inside perimeter of the base loop 40 is sized to receive an outer perimeter of one of the T-joints. Each retention device 38 is preferably inserted at an angle "A" relative to the ground 100. The preferable range of angle "A" is between 45–85. The angled retention devices 38 make it difficult for an animal to pry the poison dispenser 10, 10' off the ground 100. A retention device may also be attached around or to the poison dispenser and to an object, such as a tree with a strap or the like.

Figure 7:
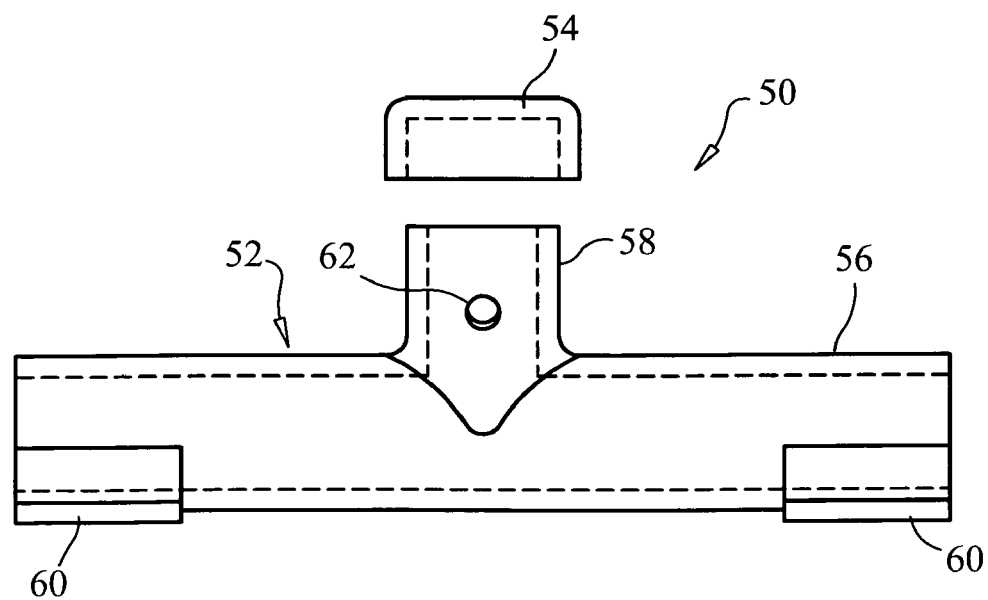
FIG. 7 is a side view of a second embodiment of a poison dispenser in accordance with the present invention.
Figure 8:
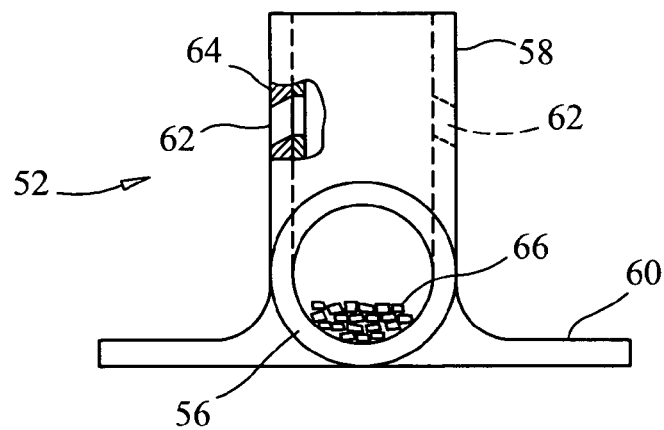
FIG. 8 is an end view of a second embodiment of a poison dispenser in accordance with the present invention.
Figure 9:
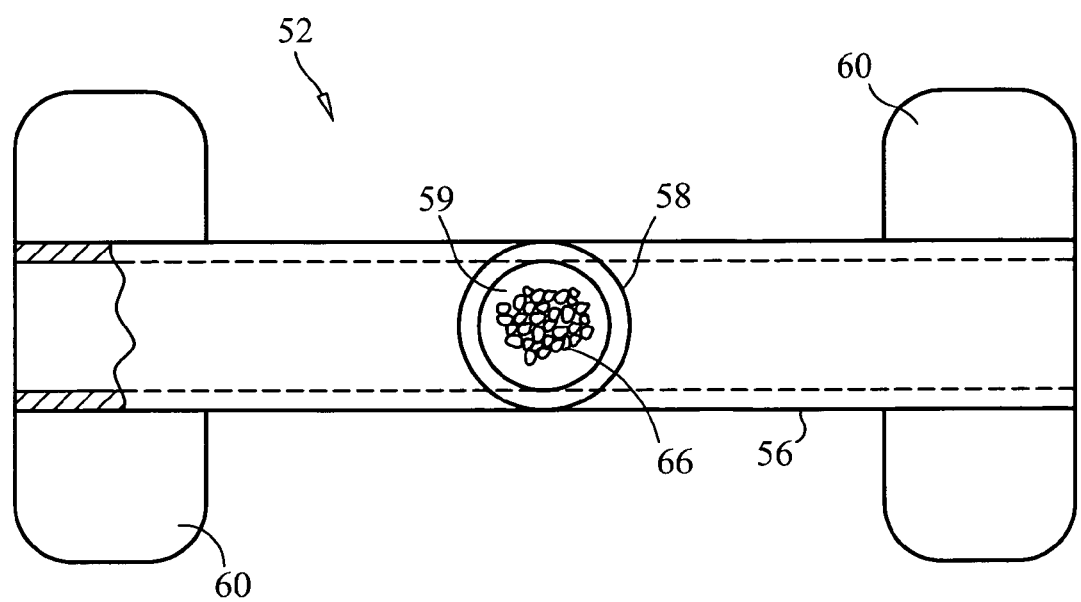
FIG. 9 is a top view of a second embodiment of a poison dispenser in accordance with the present invention.

With reference to FIGS. 7–9, a second embodiment of a poison dispenser 50 includes a tubular body 52 and a fill cap 54. The tubular body 52 includes a horizontal tubular passage 56, a vertical tubular passage 58 and at least one support foot 60. The vertical tubular passage 58 communicates with a top of the horizontal tubular passage 56. A single support foot 60 is preferably formed on each end of the horizontal tubular passage 58. The tubular body 52 is preferably formed from a single injected molded piece, but other fabrication methods may also be used. The size of the tubular body 52 is made large enough to only allow a particular size of vermin to enter and not a larger creature.

The vertical tubular passage 58 is sized to receive the fill cap 54. At least one scent opening 62 is preferably formed through a wall of the vertical tubular passage 58. A quantity of a scent 64, such as peanut butter is applied to an inside of the vertical tubular passage 58, adjacent the at least one scent opening 64. A quantity of poison 66 is dropped down the vertical tubular passage 58 to a poison retention area 59 and the fill cap 54 placed on the vertical tubular passage 58. The retention device 38 is preferably used to secure the poison dispenser 10, 10', 50 to a surface, such as the ground or an object.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of dispensing poison to kill unwanted pests, comprising the steps of:
   providing a poison dispenser having a poison retention area and at least one tubular passage leading to said poison retention area, said poison retention area comprising a poison T-joint and said at least one tubular passage comprising a first entrance T-joint and a second entrance T-joint;
   inserting a first tube into one end of said poison T-joint and into said first entrance T-joint;
   inserting a second tube into an opposing end of said poison T-joint and into said second entrance T-joint;
   inserting a scent tube into a remaining end of said poison T-joint such that it extends from said dispenser, said scent tube having at least one scent opening formed therethrough;
   filling said poison retention area with a quantity of poison;
   covering said scent tube with a fill cap; and
   securing said poison dispenser to a surface.

2. The method of dispensing poison to kill unwanted pests of claim 1, further comprising the step of:
   forming said at least one tubular passage to allow only a particular size of pest to move therethrough, but not a larger creature.

3. The method of dispensing poison to kill unwanted pests of claim 1, further comprising the step of:
   applying a scent adjacent said at least one scent opening that attracts the unwanted pests.

4. The method of dispensing poison to kill unwanted pests of claim 1, further comprising the step of:
   securing said poison dispenser to the surface with two retention devices, each one of said two retention devices being disposed at an obtuse angle relative to a bottom of said at least one tubular passage.

5. A method of dispensing poison to kill unwanted pests, comprising the steps of:
   providing a poison dispenser having a poison retention area and at least one tubular passage leading to said poison retention area, said poison retention area comprising a poison T-joint and said at least one tubular passage comprising a first entrance T-joint and a second entrance T-joint;
   inserting a first tube into one end of said poison T-joint and said first entrance T-joint;
   inserting a second tube into an opposing end of said poison T-joint and said second entrance T-joint;
   inserting a scent tube into a remaining end of said poison T-joint such that it extends from said dispenser, said scent tube having at least one scent opening formed therethrough;
   applying a scent adjacent said at least one scent opening that attracts the unwanted pests;
   filling said poison retention area with a quantity of poison;
   covering said scent tube with a fill cap; and
   securing said poison dispenser to a surface.

6. The method of dispensing poison to kill unwanted pests of claim 5, further comprising the step of:
   forming said at least one tubular passage to allow only a particular size of pest to move therethrough, but not a larger creature.

7. The method of dispensing poison to kill unwanted pests of claim 5, further comprising the step of:
   securing said poison dispenser to the surface with two retention devices, each one of said two retention devices being disposed at an obtuse angle relative to a bottom of said at least one tubular passage.

8. A method of dispensing poison to kill unwanted pests, comprising the steps of:
   providing a poison dispenser having a poison retention area and at least one tubular passage leading to said poison retention area, said poison retention area comprising a poison T-joint and said at least one tubular passage comprising a first entrance T-joint and a second entrance T-joint;
   inserting a first tube into one end of said poison T-joint and said first entrance T-joint;

inserting a second tube into an opposing end of said poison T-joint and said second entrance T-joint;

inserting a scent tube into a remaining end of said poison T-joint such that it extends from said dispenser, said scent tube having at least one scent opening formed therethrough;

filling said poison retention area with a quantity of poison;

covering said scent tube with a fill cap; and securing said poison dispenser to a surface with two retention devices, each one of said two retention devices being disposed at an obtuse angle relative to a bottom of said at least one tubular passage.

9. The method of dispensing poison to kill unwanted pests of claim 8, further comprising the step of:

applying a scent adjacent said at least one scent opening that attracts the unwanted pests.

10. The method of dispensing poison to kill unwanted pests of claim 8, further comprising the step of:

forming said at least one tubular passage to allow only a particular size of pest to move therethrough, but not a larger creature.

\* \* \* \* \*